(12) United States Patent
Ling et al.

(10) Patent No.: US 6,847,658 B1
(45) Date of Patent: Jan. 25, 2005

(54) DEMULTIPLEXER FOR CHANNEL INTERLEAVING

(75) Inventors: Fuyun Ling, San Diego, CA (US); Joseph P. Odenwalder, Del Mar, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/209,205

(22) Filed: Dec. 10, 1998

(51) Int. Cl.[7] .............................. H04J 3/04; H04L 27/30
(52) U.S. Cl. ...................................... 370/536; 375/267
(58) Field of Search .................................. 370/329, 335, 370/342, 536, 542; 375/140, 141, 146, 295, 299, 260, 267, 347, 349; 455/11.1, 12.1, 13.3, 17, 38.1, 61, 91, 101

(56) References Cited

U.S. PATENT DOCUMENTS

| | | | |
|---|---|---|---|
| 4,135,059 A | 1/1979 | Schmidt | 179/15 |
| 4,256,925 A | 3/1981 | Goode | 370/104 |
| 4,291,409 A | 9/1981 | Weinberg et al. | 375/1 |
| 4,319,353 A | 3/1982 | Alvarez, III et al. | 370/104 |
| 4,322,845 A | 3/1982 | Fennel, Jr. et al. | 370/104 |
| 4,339,818 A | 7/1982 | Gruenberg | 370/112 |
| 4,383,327 A | 5/1983 | Kruger | 378/19 |
| 4,455,649 A | 6/1984 | Esteban et al. | 370/80 |
| 4,475,215 A | 10/1984 | Gutleber | 375/34 |
| 4,477,900 A | 10/1984 | Gruenberg | 370/112 |
| 4,491,947 A | 1/1985 | Frank | 370/94 |
| 4,494,232 A | 1/1985 | Dambrackas et al. | 370/80 |
| 4,547,880 A | 10/1985 | De Vita et al. | 370/91 |
| 4,587,652 A | 5/1986 | Goldman | 370/110.1 |
| 4,594,476 A | 6/1986 | Freeman | 179/6.08 |
| 4,672,605 A | 6/1987 | Hustig et al. | 370/76 |
| 4,672,658 A | 6/1987 | Kavehrad et al. | 379/63 |
| 4,761,778 A | 8/1988 | Hui | 370/46 |

(List continued on next page.)

FOREIGN PATENT DOCUMENTS

| | | | |
|---|---|---|---|
| EP | 0044592 | 1/1982 | H01F/1/33 |
| EP | 0412583 | 3/1986 | H04B/1/56 |
| EP | 0419429 | 7/1990 | H04B/7/02 |
| EP | 0418865 | 9/1990 | H04L/12/56 |
| EP | 0744841 | 11/1996 | |
| EP | 0755130 | 1/1997 | |
| GB | 2182528 | 10/1986 | H04J/3/00 |
| GB | 2237706 | 5/1991 | H04B/7/04 |
| GB | 2022365 | 5/1999 | |
| WO | 9107030 | 5/1991 | H04J/3/06 |
| WO | 9210890 | 6/1992 | H04J/13/00 |
| WO | 9627250 | 9/1996 | H04J/11/00 |
| WO | 9749199 | 12/1997 | |

OTHER PUBLICATIONS

"Multicarrier CDMA with Adaptive Frequency Hopping for Mobile Radio Systems", Chen et al., IEEE Journal On Selected Areas In Communications, vol. 14 No. 9, Dec. 1996, pp. 1852–1858.

(List continued on next page.)

*Primary Examiner*—Alpus H. Hsu
(74) *Attorney, Agent, or Firm*—Philip R. Wadsworth; Thien N. Nguyen; Erin P. Madill

(57) ABSTRACT

A demultiplexer for channel interleaving in communications systems with multiple carriers and/or transmitter diversity includes a distribution module that distributes data bits in succession to successive transmitter antennas, and a switching module coupled to the distribution module. The distribution module routes one data bit to each antenna such that no data bit is routed to the same antenna as the previous data bit. The switching module controls the distribution module to skip an antenna in the routing process once each time a predefined number of data bits has been routed. Alternatively, the switching module may control the distribution module to repeat an antenna in the routing process once each time a predefined number of data bits has been routed. The transmitter antennas may, in the alternative, be different carrier frequency bands.

13 Claims, 8 Drawing Sheets

U.S. PATENT DOCUMENTS

| | | | |
|---|---|---|---|
| 4,841,527 A | 6/1989 | Raychaudhuri et al. | 371/32 |
| 4,850,036 A | 7/1989 | Smith | 455/179 |
| 4,866,732 A | 9/1989 | Carey et al. | 375/1 |
| 4,866,733 A | 9/1989 | Morishita | 375/1 |
| 4,870,642 A | 9/1989 | Nohara et al. | 370/75 |
| 4,901,307 A | 2/1990 | Gilhousen et al. | 370/18 |
| 4,914,676 A | 4/1990 | Iwamatsu et al. | 375/102 |
| 4,920,348 A | 4/1990 | Baghdady | 342/433 |
| 4,970,648 A | 11/1990 | Capots | 364/424.06 |
| 4,984,247 A | 1/1991 | Kaufmann et al. | 375/1 |
| 5,003,534 A | 3/1991 | Gerhardt et al. | 370/94.1 |
| 5,018,165 A | 5/1991 | Sohner et al. | 375/1 |
| 5,046,066 A | 9/1991 | Messenger | 370/94.1 |
| 5,056,109 A | 10/1991 | Gilhousen et al. | 375/1 |
| 5,073,900 A | 12/1991 | Mallinckrodt | 375/1 |
| 5,101,501 A | 3/1992 | Gilhousen et al. | 455/33 |
| 5,109,390 A | 4/1992 | Gilhousen et al. | 375/1 |
| 5,121,383 A | 6/1992 | Golestani | 370/60 |
| 5,168,575 A | 12/1992 | Cizek et al. | 455/33.1 |
| 5,276,730 A | 1/1994 | Cimini, Jr. et al. | 379/60 |
| 5,280,472 A | 1/1994 | Gilhousen et al. | 370/18 |
| 5,289,499 A | 2/1994 | Weerackody | 375/1 |
| 5,305,308 A | 4/1994 | English et al. | 370/32.1 |
| 5,347,535 A | 9/1994 | Karasawa | 375/1 |
| 5,349,580 A | 9/1994 | Hester et al. | 370/84 |
| 5,410,300 A * | 4/1995 | Gould et al. | 340/825.79 |
| 5,410,538 A | 4/1995 | Roche et al. | 370/18 |
| 5,442,627 A | 8/1995 | Viterbi et al. | 370/22 |
| 5,471,497 A * | 11/1995 | Zehavi | 375/200 |
| 5,490,165 A | 2/1996 | Blakeney, II et al. | 375/205 |
| 5,506,865 A | 4/1996 | Weaver, Jr. | 375/205 |
| 5,513,176 A | 4/1996 | Dean et al. | 370/18 |
| 5,602,833 A * | 2/1997 | Zehavi | 370/209 |
| 5,608,725 A | 3/1997 | Grube et al. | 370/338 |
| 5,777,990 A * | 7/1998 | Zehavi et al. | 370/335 |
| 6,091,759 A * | 7/2000 | Rotstein et al. | 375/140 |
| 6,128,330 A * | 10/2000 | Schilling | 375/141 |
| 6,229,824 B1 * | 5/2001 | Marko | 370/477 |
| 6,324,206 B1 * | 11/2001 | Rotstein et al. | 375/140 |

OTHER PUBLICATIONS

Flexwell Radial Cable Spec. , Radio Frequency Systems Inc., Cablewave Systems, 1993.

Distributed Communications Equipment and System Design Spec. from Andrew Systems pp. 424–453.

Microwave Systems TRC500–FR Spec.

Microwave Systems TR875–FR Spec.

Takahashi, et al. "Antenna and Multi–Carrier Combined Diversity System" IEICE Trans Commun. E79–B(9): 1221–1226 (1996).

* cited by examiner

US 6,847,658 B1

DEMULTIPLEXER FOR CHANNEL INTERLEAVING

BACKGROUND OF THE INVENTION

I. Field of the Invention

The present invention pertains generally to the field of communications systems, and more specifically to demultiplexing for channel interleaving in communications systems with multiple carriers and/or transmitter diversity.

II. Background

Communications systems often employ channel encoding, and in connection therewith, a channel interleaver. Channel interleavers are particularly important for communication over fading channels. Interleavers are generally organized as a matrix of rows and columns of bit locations for storing data elements, or bits. The bits are written into the interleaver row by row and read out of the interleaver column by column. The interleaver mixes up the order of the bits generated during the encoding process. A particularly useful form of interleaver is a bit-reversal interleaver, which rearranges the rows as part of the interleaving process, thereby maximizing the time separation between adjacently written bits.

The main objective of a channel interleaver is to maximize the achievable diversity gain over fading channels. In a single-channel communications system, i.e., in a communications system with a single carrier (i.e., a single frequency band) and a single antenna, diversity can be achieved by time-separating the contiguous transmitted bits through interleaving, thereby producing decreased correlation between the transmitted bits. When a convolutional coder, or alternatively, a multiple-component coder (i.e., a turbo coder) that uses convolutional codes as its component codes, is used for channel encoding, the bits that are close together are likely to contribute to multiple error events. A bit-reversal interleaver is therefore particularly effective because, after bit-reversal interleaving, the distance between any two bits will be roughly inverse-proportional to the distance between the two bits before interleaving.

As an example, consider a 384-bit interleaver that is organized as a matrix of six columns and sixty-four rows. The data elements, or bits, are written into the interleaver matrix column by column. Prior to transmission, the bits are read out row by row, in a bit-reversed order of row indices. An exemplary interleaver matrix appears in pertinent part as follows:

$$\begin{pmatrix} 0 & 64 & 128 & 192 & 256 & 320 \\ 1 & 65 & 129 & 193 & 267 & 321 \\ \vdots & \vdots & \vdots & \vdots & \vdots & \vdots \\ 16 & 80 & 144 & 208 & 272 & 336 \\ \vdots & \vdots & \vdots & \vdots & \vdots & \vdots \\ 32 & 96 & 194 & 195 & 196 & 197 \\ \vdots & \vdots & \vdots & \vdots & \vdots & \vdots \\ \vdots & \vdots & \vdots & \vdots & \vdots & \vdots \\ 63 & 127 & 191 & 255 & 319 & 383 \end{pmatrix}$$

In transmission, the $0^{th}$ row is sent first, followed by the $32^{nd}$ row, and then the $16^{th}$ row, and so on. The $1^{st}$ row, i.e., the row having the elements 1, 65, 129, 193, 267, and 321, is sent as the $32^{rd}$ row. Thus, the 0 bit and the 1 bit are separated by 191 other bits. The bits 0 through 6 will be transmitted in the following positions: 0 for bit 0, 192 for bit 1, 96 for bit 2, 288 for bit 3, 48 for bit 4, 240 for bit 5, and 144 for bit 6. Those of skill in the art can readily appreciate that after interleaving, any two adjacent bits are separated by at least 96 other bits, and any two bits separated by one bit are themselves separated by at least 48 other bits. Consequently, bit-reversal interleavers are widely used in, e.g., wireless communications systems, in which communications occur over fading channels.

However, a conventional, bit-reversal interleaving technique is less effective in achieving diversity gain in such systems when either antenna diversity or multiple carriers (frequency bands) are used. For example, when antenna diversity is used, the transmitted bits are broken into two bit streams that are transmitted separately from two antennas. A natural choice for the separation is to send the even bits to the first antenna (antenna 1) and send the odd bits to the second antenna (antenna 2). However, as can be seen from the above example, the first seven bits are all even bits, which will therefore be transmitted by antenna 1, allowing the scheme to degrade receiver performance. Namely, in the decoding process at the receiver end, these bits will be more likely to affect multiple error events than if the bits had been transmitted by different antennas. Hence, the advantage of antenna diversity has not been fully exploited.

A similar analysis can be conducted for a wireless communications system that uses multiple carriers. In such a system, bits would be routed to two or more different-frequency modulators, rather than being routed to two different antennas. Thus, there is a need for a device that enhances the capability of a channel interleaver to provide diversity gain in communications systems that use transmitter diversity and/or multiple carriers.

SUMMARY OF THE INVENTION

The present invention is directed to a device that enhances the capability of a channel interleaver to provide diversity gain in communications systems that use transmitter diversity and/or multiple carriers. Accordingly, in one aspect of the invention, a demultiplexer for channel interleaving advantageously includes a distribution module configured to distribute in succession a plurality of data elements to a plurality of locations, each data element being distributed to one location that is different than the location to which the previous data element was distributed; and a switching module coupled to the distribution module and configured to control the distribution module to once bypass a location after a predefined number of data elements has been distributed.

In another aspect of the invention, a demultiplexer is advantageously configured to distribute in succession a plurality of data elements to a plurality of locations, each data element being distributed to one location that is different than the location to which the previous data element was distributed, the demultiplexer being further configured to once bypass a location after a predefined number of data elements has been distributed.

In another aspect of the invention, a transmit section of a digital wireless communications system advantageously includes a channel encoder; a channel interleaver coupled to the channel encoder; and a demultiplexer coupled to the channel interleaver and configured to distribute data elements in succession to a plurality of locations, each data element being distributed to one location that is different than the location to which the previous data element was distributed, the demultiplexer being further configured to once bypass a location after a predefined number of data bits has been distributed.

In another aspect of the invention, a method of demultiplexing data elements advantageously includes the steps of routing data elements in succession to a plurality of locations in succession such that each data element is routed to one location that is different from the location to which the previous data element was routed; and bypassing one location once each time a predefined number of data elements is routed.

In another aspect of the invention, a demultiplexer advantageously includes means for means for routing data elements in succession to a plurality of locations in succession such that each data element is routed to one location that is different from the location to which the previous data element was routed; and means for bypassing one location once each time a predefined number of data elements is routed.

In another aspect of the invention, a demultiplexer for channel interleaving advantageously includes a distribution module configured to distribute in succession a plurality of data elements to a plurality of locations, each data element being distributed to one location that is different than the location to which the previous data element was distributed; and a switching module coupled to the distribution module and configured to control the distribution module to once repeat a location after a predefined number of data elements has been distributed.

In another aspect of the invention, a demultiplexer is advantageously configured to distribute in succession a plurality of data elements to a plurality of locations, each data element being distributed to one location that is different than the location to which the previous data element was distributed, the demultiplexer being further configured to once repeat a location after a predefined number of data elements has been distributed.

In another aspect of the invention, a transmit section of a digital wireless communications system advantageously includes a channel encoder; a channel interleaver coupled to the channel encoder; and a demultiplexer coupled to the channel interleaver and configured to distribute data elements in succession to a plurality of locations, each data element being distributed to one location that is different than the location to which the previous data element was distributed, the demultiplexer being further configured to once repeat a location after a predefined number of data elements has been distributed.

In another aspect of the invention, a method of demultiplexing data elements advantageously includes the steps of routing data elements in succession to a plurality of locations in succession such that each data element is routed to one location that is different from the location to which the previous data element was routed; and repeating one location once each time a predefined number of data elements is routed.

In another aspect of the invention, a demultiplexer advantageously includes means for routing data elements in succession to a plurality of locations in succession such that each data element is routed to one location that is different from the location to which the previous data element was routed; and means for repeating one location once each time a predefined number of data elements is routed.

DETAILED DESCRIPTION OF THE PREFERRED EMBODIMENTS

Figure 1:
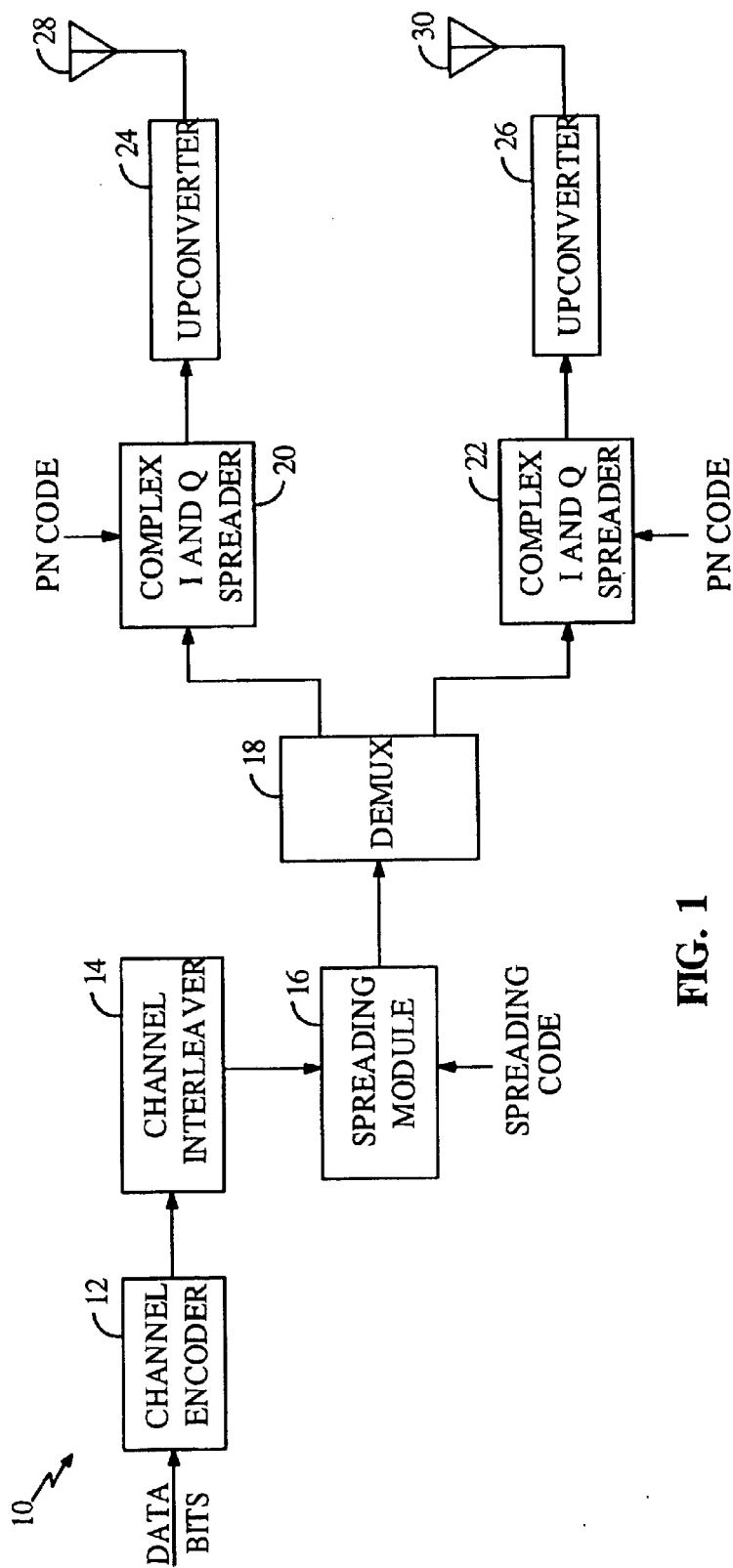
FIG. 1 is a block diagram of a transmit section of a communications system.

In accordance with one embodiment, as illustrated in FIG. 1, a transmit section 10 of a communications system (not shown) includes a channel encoder 12, a channel interleaver 14, a spreading module 16, a demultiplexer (demux) 18, first and second complex I and Q spreaders 20, 22, first and second upconverters 24, 26, and first and second transmit antennas 28, 30. Data bits are input in successive frames to the channel encoder 12, which encodes the data bits in accordance with a conventional coding technique such as, e.g., convolutional coding or turbo coding.

The channel encoder 12 is coupled to the channel interleaver 14 and provides data symbols to the channel interleaver 14. The channel interleaver 14 may be a block interleaver 14 organized in a matrix of rows and columns. Data symbols are written into the interleaver 14 row by row and read out of the interleaver 14 column by column. The interleaver 14 is advantageously configured to use a bit-reversal scheme such that individual row addresses are rearranged, or shuffled, within the interleaver 14. The bit-reversal technique allows the interleaver 14 to interleave adjacent input symbols to produce maximally time-separated output symbols.

The channel interleaver 14 is coupled to the spreading module 16 and provides interleaved data symbols to the spreading module 16. The spreading module 16 is also configured to receive a spreading code. The spreading module 16 may advantageously be an orthogonal spreading module 16 that receives an orthogonal spreading code. In this case the communications system is advantageously a digital wireless communications system configured in accordance with a code division multiple access over-the-air interface, as described below. The spreading module 16 spreads the data symbols with the received spreading code, generating groups of data chips, with each group of data chips representing a data symbol. Advantageously, M-ary orthogonal spreading is performed, where $M=2^m$, e.g., M equals sixteen, thirty-two, sixty-four, or 128.

The spreading module 16 is coupled to the demux 18 and provides the data chips to the demux 18. The demux 18 demultiplexes the chips, segmenting, or parsing, the stream of chips into first and second chip streams for distribution, or routing, to, respectively, the first and second complex I and Q spreaders 20, 22. Each group of data chips representing a data symbol is advantageously routed to an alternate complex I and Q spreader 20, 22, as described below. Additionally, as described in greater detail below, switching logic (not shown) within the demux 18 serves to skip, or bypass, one of the complex I and Q spreaders 20, 22 once each time a predefined number of data symbols of a given frame has been distributed. Alternatively, also as described in greater detail below, the switching logic may serve to repeat one of the complex I and Q spreaders 20, 22 once each time a predefined number of data symbols of a given frame has been distributed. In the embodiment depicted in FIG. 1, after half of the symbols of a frame have been routed by the demux 18, the switching logic controls the demux 18 to bypass one of the complex I and Q spreaders 20, 22. As a result, the symbol segmentation is effectively reversed, i.e., at the frame midpoint, one complex I and Q spreader 20 receives two groups of data chips (each group representing a data symbol) in succession, and the other complex I and Q spreader 22 is either bypassed or repeated for one group of data chips representing a data symbol. After the frame midpoint, distribution continues in the alternating fashion described above.

In an alternate embodiment, the demux 18 is configured to route groups of data chips along three data paths, and the switching logic is configured to bypass (or, alternatively, to repeat) one data path once each time one-third of the symbols of the frame have been routed. In another alternate embodiment, the demux 18 is configured to route groups of data chips along three data paths, and the switching logic is configured to bypass (or, alternatively, to repeat) one data path once each time one-fourth of the symbols of the frame have been routed. Hence, the last fourth of the symbols are routed in the same way as the first fourth of the symbols were routed. Those skilled in the art would readily appreciate that neither the number of data paths from the demux 18 nor the number of such "skips" or "repeats" performed is limited by anything other than physical and time design constraints. Moreover, those of skill would also understand that the controlled bypass or repeat of routing to a particular data path (i.e., a particular antenna or carrier frequency band) occurs after a predefined number of data elements has been processed by the demux 18, with the term "data element" meaning a data symbol (i.e., physically a bit, but representing multiple data bits), or a group of data chips (i.e., physically multiple bits, but representing one data symbol).

Those of skill in the art would understand that in the alternative, the demux 18 could be coupled directly to the channel interleaver 14. First and second spreading modules would then be coupled to the output data paths of the demux 18.

In the embodiment shown in FIG. 1, the first complex I and Q spreader 20 is configured to receive a pseudo-random noise spreading code. With the pseudo-random spreading code, the first complex I and Q spreader 20 generates complex I and Q signals from the received data chips. Likewise, the second complex I and Q spreader 22 is configured to receive a pseudo-random noise spreading code. With the pseudo-random spreading code, the second complex I and Q spreader 22 generates complex I and Q signals from the received data chips.

The first and second complex I and Q spreaders 20, 22 are coupled to, respectively, the first and second upconverters 24, 26. The first and second complex I and Q spreaders 20, 22 provide the complex I and Q signals to the respective first and second upconverters 24, 26. The first and second upconverters 24, 26 are coupled to, respectively, the first and second antennas 28, 30. The upconverters 24, 26 upconvert the signals to an appropriate carrier frequency such as, e.g., 800 MHz for a cellular system or 1900 MHz for a PCS system, and convert the signal to analog form for RF transmission over the air.

The two antennas 28, 30 are advantageously used to provide antenna diversity. Alternatively, the antennas 28, 30 could be coupled to upconverters configured to upconvert the respective signals to different carrier frequency bands. In one embodiment three antennas are used to provide three carrier frequencies. In another embodiment multiple antennas are used to provide both diversity and multicarrier advantages.

The Telecommunications Industry Association has promulgated the over-the-air interface standard TIA/EIA Interim Standard 95 (IS-95) and its derivatives, such as, e.g., IS-95B (hereinafter referred to collectively as IS-95), which define a code division multiple access (CDMA) digital wireless communications system. A system and method for processing radio-frequency (RF) signals substantially in accordance with the use of the IS-95 standard is described in U.S. Pat. No. 5,103,459, which is assigned to the assignee of the present invention and fully incorporated herein by reference. In the embodiment of FIG. 1, the communications system is advantageously a digital wireless communications system, such as, e.g., a cellular or PCS telephone system, configured in accordance with an IS-95-based standard.

Figure 2:
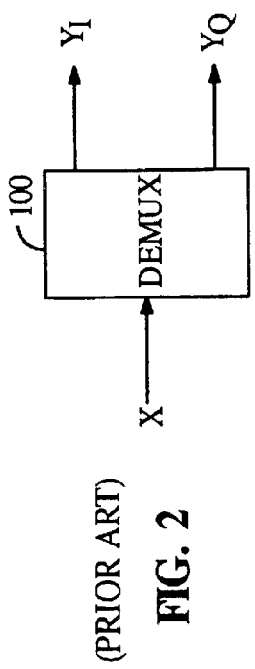
FIG. 2 is a block diagram of a conventional demultiplexer for use in connection with a channel interleaver in a single-antenna, single-carrier communications system.

In FIG. 2 a conventional demux 100 is configured for use in a communications system (not shown) using a single transmit antenna and a single carrier. The demux 18 receives one X input and produces two Y outputs, specifically, a $Y_I$ output and a $Y_Q$ output.

Figure 3:
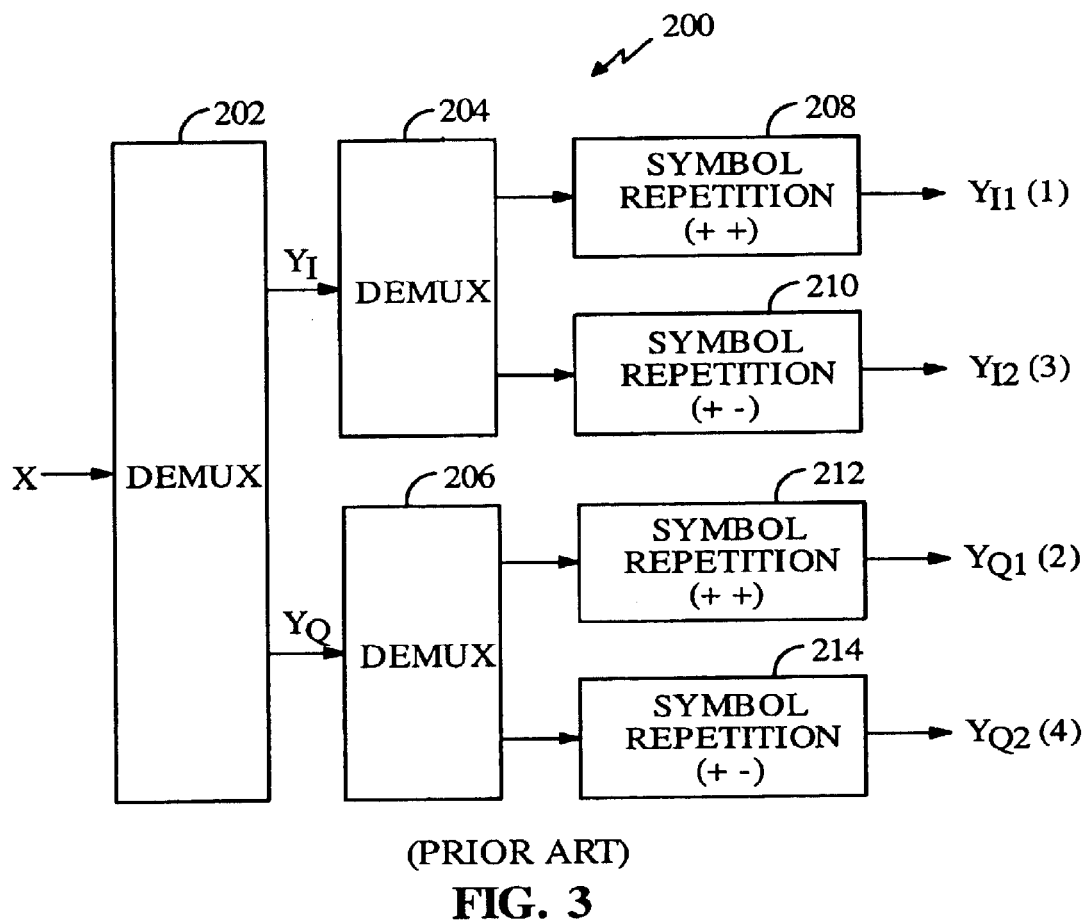
FIG. 3 is a block diagram of a conventional demultiplexer for use in a communications system that employs transmitter antenna diversity.

In FIG. 3 a conventional demux 200 configured for use in a two-antenna, spread spectrum, digital wireless communications system includes a first demux 202, second and third demuxes 204, 206, and four symbol repeaters 208, 210, 212, 214. The first demux 202 receives data symbols at an X input. The first demux 202 demultiplexes the data symbols, providing even-numbered symbols through a $Y_I$ output to the second demux 204, and providing odd-numbered symbols through a $Y_Q$ output to the third demux 206. The second and third demuxes 204, 206 receive and demultiplex the symbols. The second demux 204 provides a first symbol stream to the symbol repeater 208 and a second symbol stream to the symbol repeater 210. The third demux 206 provides a first symbol stream to the symbol repeater 212 and a second symbol stream to the symbol repeater 214. The first and third symbol repeaters 208, 212 each produce two identical output symbols for each input symbol received. The second and fourth symbol repeaters 210, 214 each produce an output symbol and its complement for each symbol received. The symbol repeater 208 produces a $Y_{I1}$ output, the symbol repeater 210 produces a $Y_{I2}$ output, the symbol repeater 212 produces a $Y_{Q1}$ output, and the symbol repeater 214 produces a $Y_{Q2}$ output. Hence, for four symbols received sequentially at the X input, the first symbol is routed as an I symbol for transmission by antenna number 1, the second symbol is routed as an I symbol for transmission by antenna number 2, the third symbol is routed as a Q symbol for transmission by antenna number 1, and the fourth symbol is routed as a Q symbol for transmission by antenna number 2. Used in conjunction with a bit-reversal channel interleaver, the demux 200 fails to maximize orthogonal transmit diversity in a two-antenna system, as described above.

Figure 4:
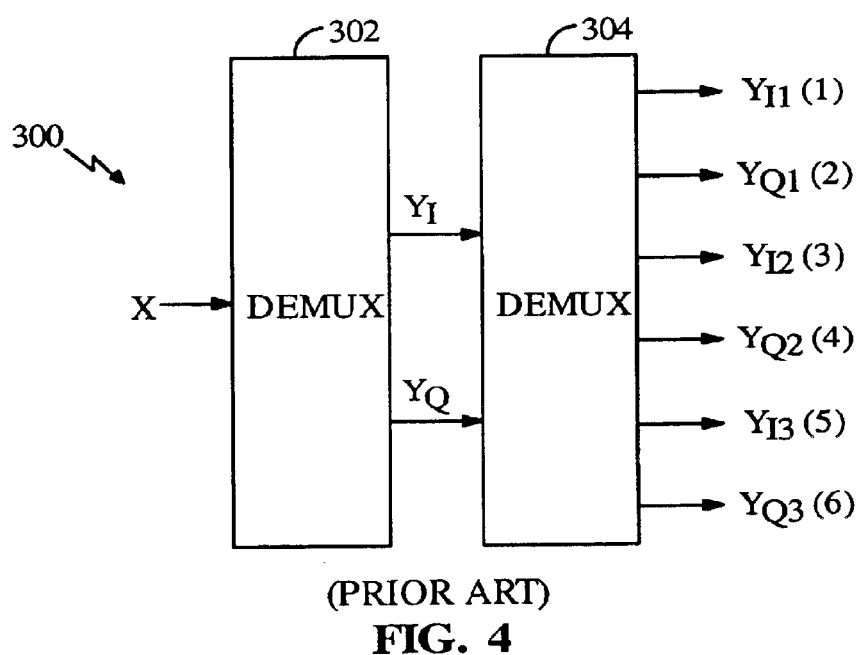
FIG. 4 is a block diagram of a conventional demultiplexer for use in a communications system that employs multiple carriers.

In FIG. 4 a conventional demux 300 configured for use in a three-carrier, spread spectrum, digital wireless communications system includes a first demux 302 and a second demux 304. The first demux 302 receives data symbols at an X input. The first demux 302 demultiplexes the received symbols, providing even-numbered symbols to the second demux 304 through a $Y_I$ output, and providing odd-numbered symbols to the second demux 304 through a $Y_Q$ output. The second demux 304 receives and demultiplexes the two input symbol streams, producing therefrom six output symbol streams at outputs $Y_{I1}$, $Y_{Q1}$, $Y_{I2}$, $Y_{Q2}$, $Y_{I3}$, and $Y_{Q3}$. Hence, for six symbols received sequentially at the X input, the first symbol is routed as an I symbol for transmission at carrier frequency number 1, the second symbol is routed as a Q symbol for transmission at carrier frequency number 1, the third symbol is routed as an I symbol for transmission at carrier frequency number 2, the fourth symbol is routed as a Q symbol for transmission by antenna number 2, the fifth symbol is routed as an I symbol for transmission at carrier frequency number 3, and the sixth symbol is routed as a Q symbol for transmission at carrier frequency number 3. Used in conjunction with a bit-reversal channel interleaver, the demux 300 fails to maximize diversity gains in a three-carrier system, as described above.

Figure 5:
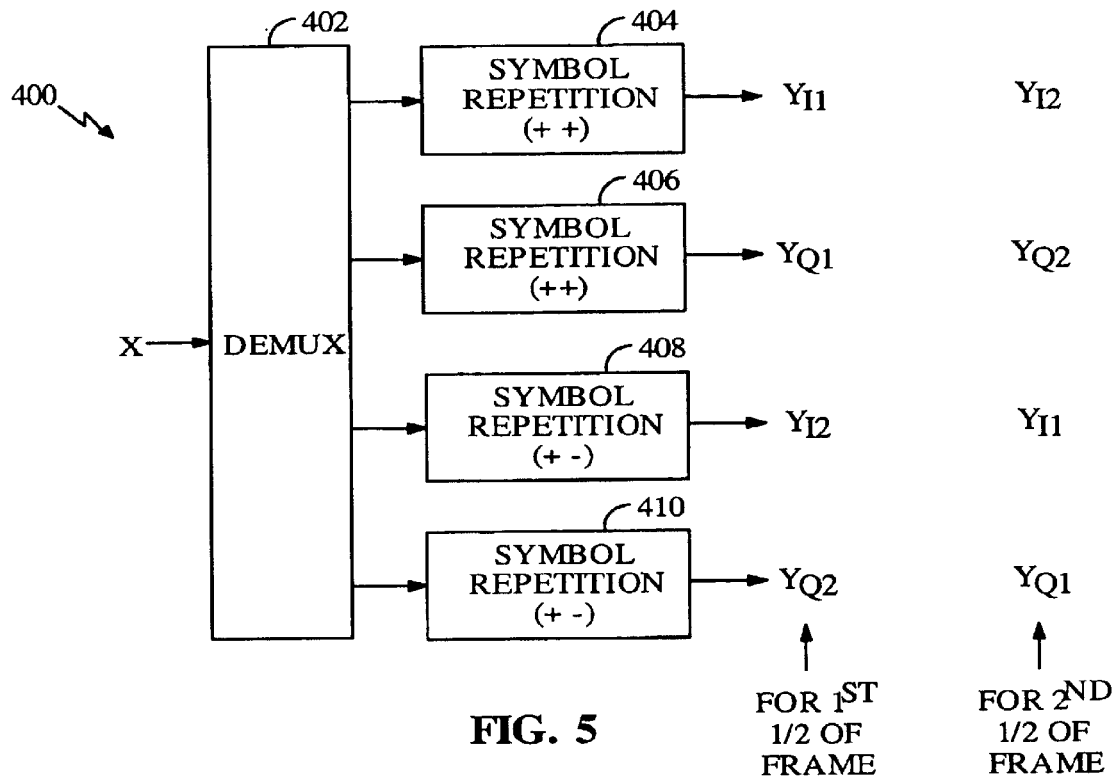
FIG. 5 is a block diagram of a demultiplexer for use in a communications system that employs transmitter antenna diversity.

In accordance with one embodiment, a demux 400 configured for use in a two-antenna, spread spectrum, digital wireless communications system includes a demux 402 modified by switching logic (not shown) and four symbol repeaters 404, 406, 408, 410, as shown in FIG. 5. The demux 402 is coupled to the four symbol repeaters 404, 406, 408, 410. The demux 402 receives data symbols at an X input and demultiplexes the received symbols four ways, producing four output symbol streams. The first output symbol stream, which comprises the first of every four symbols received at the X input, is provided to the first symbol repeater 404. The second output symbol stream, which comprises the second of every four symbols received at the X input, is provided to the second symbol repeater 406. The third output symbol stream, which comprises the third of every four symbols received at the X input, is provided to the third symbol repeater 408. The fourth output symbol stream, which comprises the fourth of every four symbols received at the X input, is provided to the fourth symbol repeater 410. The first and second symbol repeaters 404, 406 each produce two identical output symbols for each input symbol received. The third and fourth symbol repeaters 408, 410 each produce an output symbol and its complement for each symbol received.

The symbols received at the X input are received in frames, there being a predefined number of symbols per frame. For each frame, while the first half of the symbols are being processed by the demux 400, the output of the first symbol repeater 404 is routed as an I symbol for transmission by antenna number 1 (i.e., the output is denoted $Y_{I1}$), the output of the second symbol repeater 404 is routed as a Q symbol for transmission by antenna number 1 (i.e., the output is denoted $Y_{Q1}$), the output of the third symbol repeater 408 is routed as an I symbol for transmission by antenna number 2 (i.e., the output is denoted $Y_{I2}$), and the output of the fourth symbol repeater 410 is routed as a Q symbol for transmission by antenna number 2 (i.e., the output is denoted $Y_{Q2}$). Upon processing of the first symbol in the second half of the frame, routing of the output symbols from the demux 400 is switched by the switching logic, which is described below. Accordingly, for the duration of the frame, the output of the first symbol repeater 404 is routed instead as an I symbol for transmission by antenna number 2 (i.e., the output is denoted $Y_{I2}$), the output of the second symbol repeater 406 is routed instead as a Q symbol for transmission by antenna number 2 (i.e., the output is denoted $Y_{Q2}$), the output of the third symbol repeater 408 is routed instead as an I symbol for transmission by antenna number 1 (i.e., the output is denoted $Y_{I1}$), and the output of the fourth symbol repeater 410 is routed as a Q symbol for transmission by antenna number 1 (i.e., the output is denoted $Y_{Q1}$). Used in conjunction with a bit-reversal channel interleaver, the demux 400 maximizes orthogonal transmit diversity in a two-antenna system, as described above.

Figure 6:
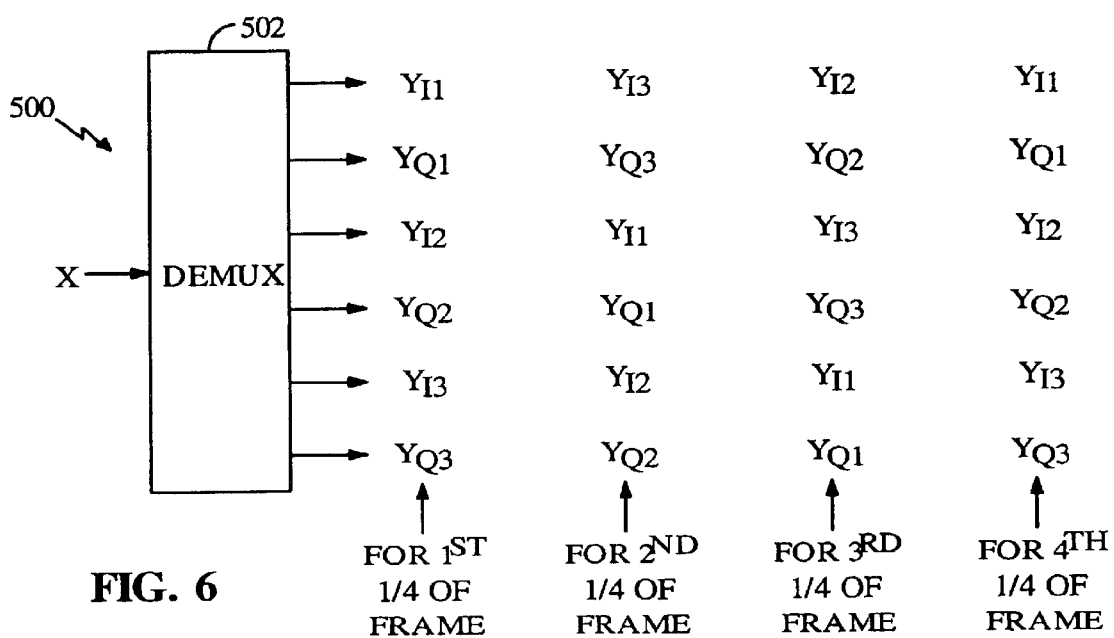
FIG. 6 is a block diagram of a demultiplexer for use in a communications system that employs multiple carriers.

In accordance with one embodiment, as illustrated in FIG. 6, a demux 500 configured for use in a three-carrier, spread spectrum, digital wireless communications system includes a demux 502 modified by switching logic (not shown). The demux 502 receives data symbols at an X input. The demux 502 demultiplexes the received symbols six ways, producing six output symbol streams. The first output symbol stream comprises the first of every six symbols received at the X input. The second output symbol stream comprises the second of every six symbols received at the X input. The third output symbol stream comprises the third of every six symbols received at the X input. The fourth output symbol stream comprises the fourth of every six symbols received at the X input. The fifth output symbol stream comprises the fifth of every six symbols received at the X input. The sixth output symbol stream comprises the sixth of every six symbols received at the X input.

The symbols received at the X input are received in frames, there being a predefined number of symbols per frame. For each frame, while the first quarter of the symbols are being processed by the demux 500, the first output of the demux 502 is routed as an I symbol for transmission at carrier frequency number 1 (i.e., the output is denoted $Y_{I1}$), the second output of the demux 502 is routed as a Q symbol for transmission at carrier frequency number 1 (i.e., the output is denoted $Y_{Q1}$), the third output of the demux 502 is routed as an I symbol for transmission at carrier frequency number 2 (i.e., the output is denoted $Y_{I2}$), the fourth output of the demux 502 is routed as a Q symbol for transmission at carrier frequency number 2 (i.e., the output is denoted $Y_{Q1}$), the fifth output of the demux 502 is routed as an I symbol for transmission at carrier frequency number 3 (i.e., the output is denoted $Y_{I3}$), and the sixth output of the demux 502 is routed as a Q symbol for transmission at carrier frequency number 3 (i.e., the output is denoted $Y_{Q3}$).

Upon processing of the first symbol in the second quarter of the frame, routing of the output symbols from the demux 500 is switched by the switching logic, which is described below. Accordingly, for the duration of the second quarter of the frame, the first output of the demux 502 is routed instead as an I symbol for transmission at carrier frequency number 3 (i.e., the output is denoted $Y_{I3}$), the second output of the demux 502 is routed instead as a Q symbol for transmission at carrier frequency number 3 (i.e., the output is denoted $Y_{Q3}$), the third output of the demux 502 is routed instead as an I symbol for transmission at carrier frequency number 1 (i.e., the output is denoted $Y_{I1}$), the fourth output of the demux 502 is routed instead as a Q symbol for transmission at carrier frequency number 1 (i.e., the output is denoted $Y_{Q1}$), the fifth output of the demux 502 is routed instead as an I symbol for transmission at carrier frequency number 2 (i.e., the output is denoted $Y_{I2}$), and the sixth output of the demux 502 is routed instead as a Q symbol for transmission at carrier frequency number 2 (i.e., the output is denoted $Y_{Q2}$).

Upon processing of the first symbol in the third quarter of the frame, routing of the output symbols from the demux 500 is again switched by the switching logic. Accordingly, for the duration of the third quarter of the frame, the first output of the demux 502 is routed instead as an I symbol for transmission at carrier frequency number 2 (i.e., the output is denoted $Y_{I2}$), the second output of the demux 502 is routed instead as a Q symbol for transmission at carrier frequency number 2 (i.e., the output is denoted $Y_{Q2}$), the third output of the demux 502 is routed instead as an I symbol for transmission at carrier frequency number 3 (i.e., the output is denoted $Y_{I3}$), the fourth output of the demux 502 is routed instead as a Q symbol for transmission at carrier frequency number 3 (i.e., the output is denoted $Y_{Q3}$), the fifth output of the demux 502 is routed instead as an I symbol for transmission at carrier frequency number 1 (i.e., the output is denoted $Y_{I1}$), and the sixth output of the demux 502 is routed instead as a Q symbol for transmission at carrier frequency number 1 (i.e., the output is denoted $Y_{Q1}$).

Upon processing of the first symbol in the fourth quarter of the frame, routing of the output symbols from the demux 500 is again switched by the switching logic. This time the switching logic returns the routing scheme to the state that it was in for the initial quarter of the frame. Accordingly, for the duration of the frame, the first output of the demux 502 is routed instead as an I symbol for transmission at carrier frequency number 1 (i.e., the output is denoted $Y_{I1}$), the second output of the demux 502 is routed instead as a Q symbol for transmission at carrier frequency number 1 (i.e., the output is denoted $Y_{Q1}$), the third output of the demux 502 is routed instead as an I symbol for transmission at carrier frequency number 2 (i.e., the output is denoted $Y_{I2}$), the fourth output of the demux 502 is routed instead as a Q symbol for transmission at carrier frequency number 2 (i.e., the output is denoted $Y_{Q2}$), the fifth output of the demux 502 is routed instead as an I symbol for transmission at carrier frequency number 3 (i.e., the output is denoted $Y_{I3}$), and the sixth output of the demux 502 is routed instead as a Q symbol for transmission at carrier frequency number 3 (i.e., the output is denoted $Y_{Q3}$).

Used in conjunction with a bit-reversal channel interleaver, the demux 500 maximizes diversity gains in a three-carrier system, as described above. Those skilled in the art would understand that it is merely for ease of implementation that the demux 500, which is used in a three-carrier system, includes switching logic that switches symbol routing four times per frame. In an alternate embodiment, a demux may be modified to switch symbol routing three times per frame may be used in a three-carrier system.

Figure 7A:
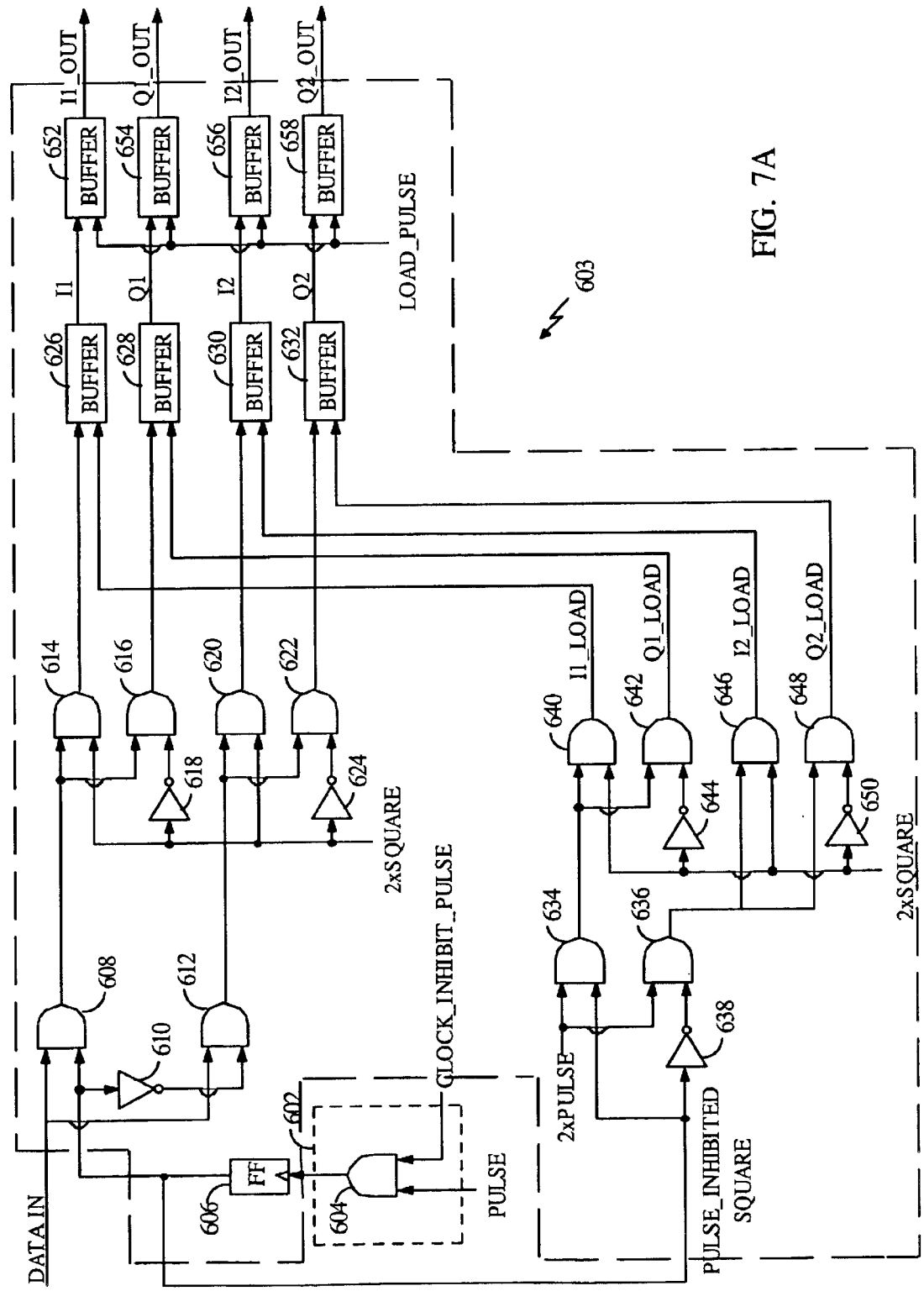
FIG. 7A is a schematic diagram of a demultiplexer for use in a communications system that employs transmitter antenna diversity.

In accordance with one embodiment, as depicted in FIG. 7A, a demux 600 includes a symbol (i.e., bit, or data element) distribution module 603 and a switching module 602. The switching module 602 is shown with dashed lines, and the distribution module 603 encompasses all elements not within the switching module 602. Various signals pertaining to the demux 600 are illustrated in the timing diagram of FIG. 7B. The demux 600 is configured to provide maximum diversity gain in a communications system with two antennas used to provide transmit diversity. The demux 600 is advantageously implemented in hardware with discrete gate logic, as shown. In alternate embodiments a demux may be implemented as a software module residing in a conventional storage medium (or, alternatively, as firmware instructions) and executable by a conventional microprocessor.

In the demux 600, the switching module 602 includes an AND gate configured to receive a CLOCK_INHIBIT_PULSE signal and a PULSE waveform. The output of the switching module 602 is provided to a flip-flop (FF) 606.

Figure 7B:
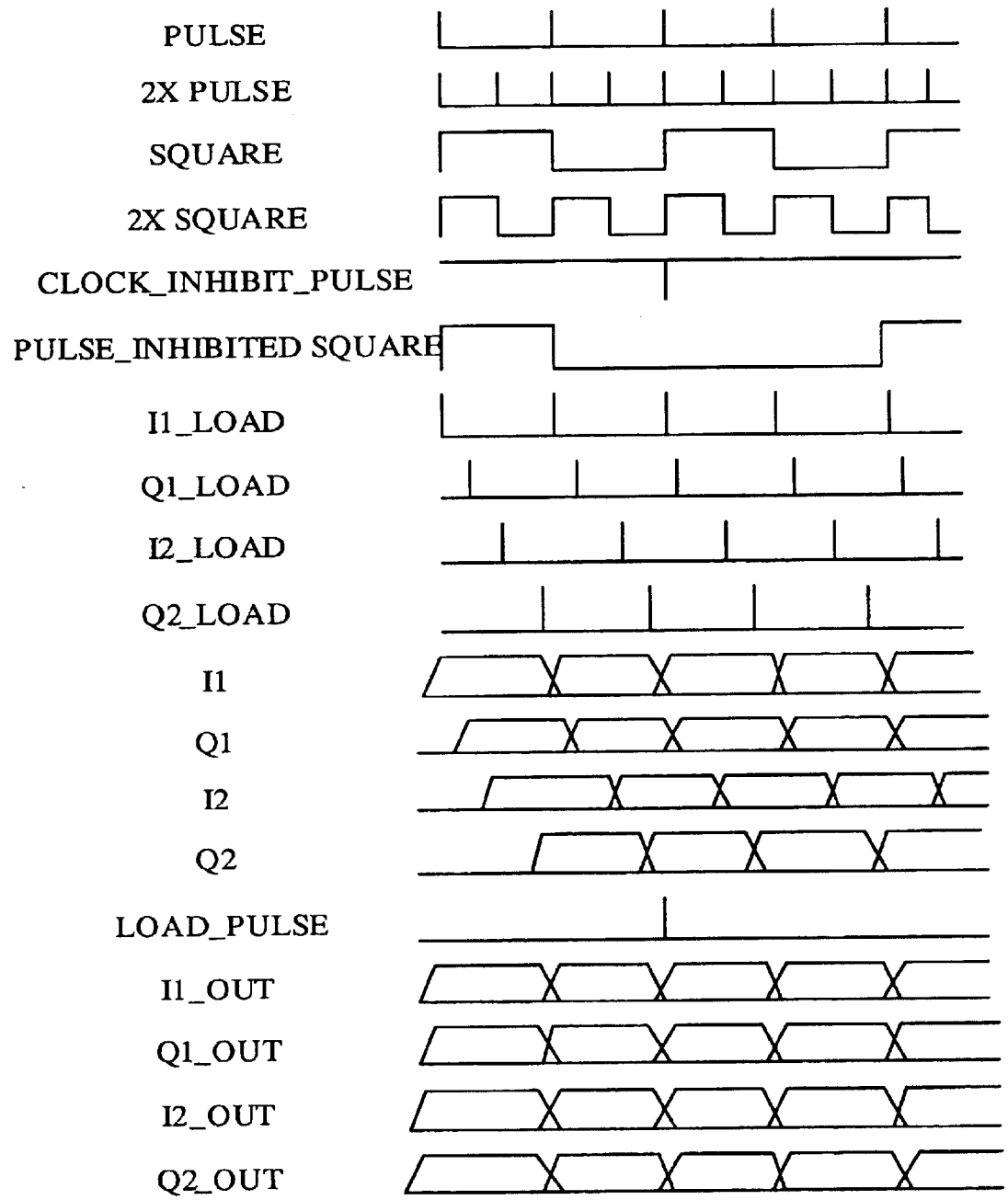
FIG. 7B is a timing diagram associated with the demultiplexer of FIG. 7A.

The output of the FF 606 is a pulse-inhibited SQUARE waveform, as shown in FIG. 7B. The pulse-inhibited SQUARE waveform is provided as a control input to an AND gate 608 and to an inverter 610. The output of the inverter 610 is provided to an AND gate 612. The AND gates 608, 612 also receive a data symbol stream input to the demux 600.

The output of the AND gate 608 is provided to an AND gate 614 and to an AND gate 616. A 2×SQUARE waveform is provided as a control input to the AND gate 614 and to an inverter 618. The output of the inverter 618 is provided to the AND gate 616. The output of the AND gate 612 is provided to an AND gate 620 and to an AND gate 622. The 2×SQUARE waveform is provided as a control input to the AND gate 620 and to an inverter 624. The output of the inverter 624 is provided to the AND gate 622.

The output of the AND gate 614 is provided to a buffer 626. The output of the AND gate 616 is provided to a buffer 628. The output of the AND gate 620 is provided to a buffer 630. The output of the AND gate 622 is provided to a buffer 632.

A 2×PULSE waveform is provided as a data input to AND gates 634, 636. The output of the FF 606 (the pulse-inhibited SQUARE waveform) is coupled as a control input to the AND gate 634 and to an inverter 638. The output of the inverter 638 is provided to the AND gate 636. The output of the AND gate 634 is provided to AND gates 640, 642. The 2×SQUARE waveform is provided as a control input to the AND gate 640 and to an inverter 644. The output of the inverter 644 is provided to the AND gate 642. The output of the AND gate 636 is provided to AND gates 646, 648. The 2×SQUARE waveform is provided as a control input to the AND gate 646 and to an inverter 650. The output of the inverter 650 is provided to the AND gate 648.

The output of the AND gate 640, an I1_LOAD waveform, as shown in FIG. 7B, is provided to the buffer 626. The output of the AND gate 642, a Q1_LOAD waveform, as shown in FIG. 7B, is provided to the buffer 628. The output of the AND gate 646, an I2_LOAD waveform, as shown in FIG. 7B, is provided to the buffer 630. The output of the AND gate 648, a Q2_LOAD waveform, as shown in FIG. 7B, is provided to the buffer 632.

The output of the buffer 626, an I1 signal, as shown in FIG. 7B, is provided to a buffer 652. The output of the buffer 628, a Q1 signal, as shown in FIG. 7B, is provided to a buffer 654. The output of the buffer 630, an I2 signal, as shown in FIG. 7B, is provided to a buffer 656. The output of the buffer 632, a Q2 signal, as shown in FIG. 7B, is provided to a buffer 658. The buffers 652, 654, 656, 658 each receive a LOAD_PULSE waveform as an input. As illustrated in FIG. 7B, the output symbol streams from the buffers 652, 654, 656, 658, respectively I1_OUT, Q1_OUT, I2_OUT, and Q2_OUT are time synchronized due to the respective buffers 652, 654, 656, 658.

Figure 8A:
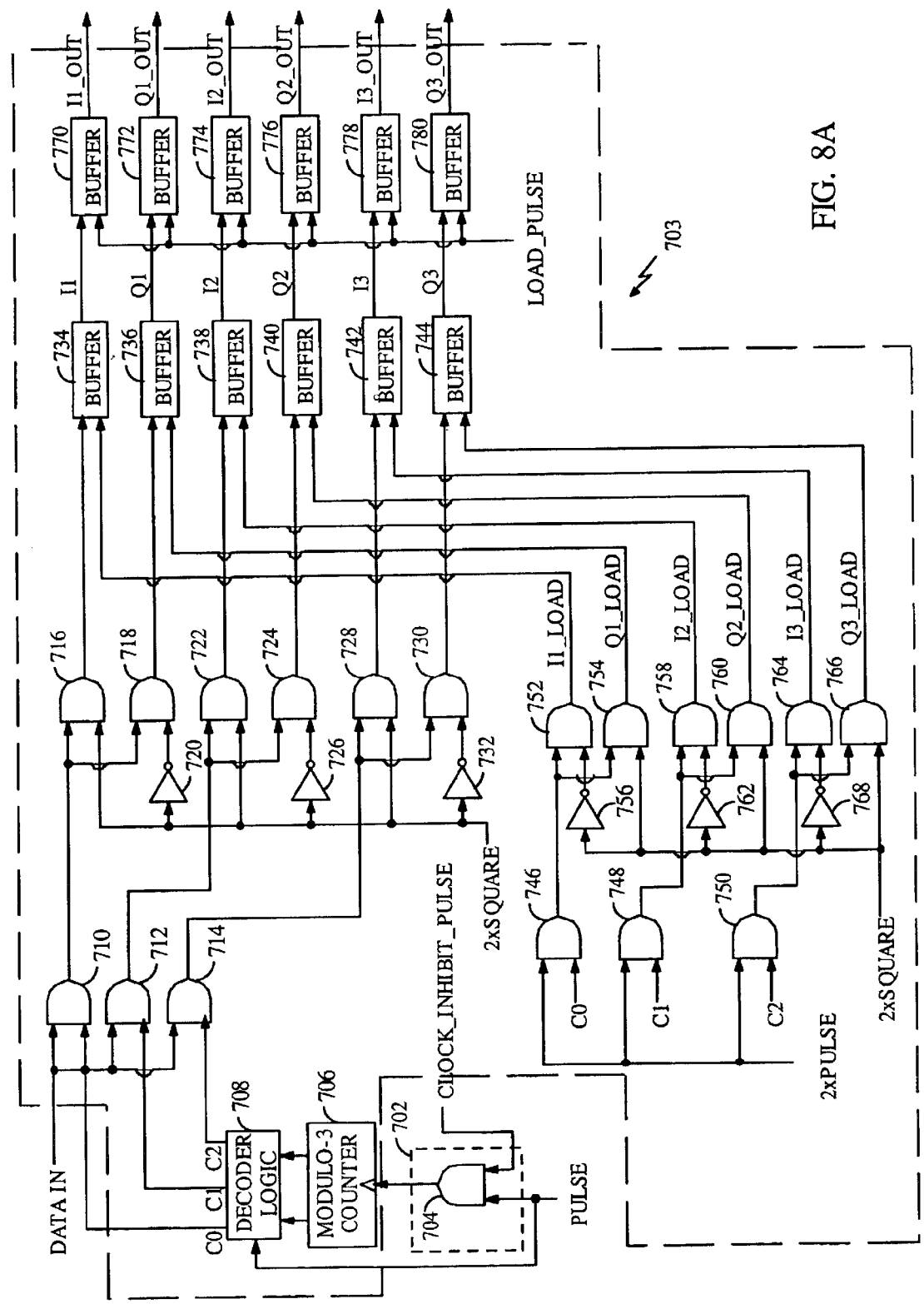
FIG. 8A is a schematic diagram of a demultiplexer for use in a communications system that employs multiple carriers.

In accordance with one embodiment, as shown in FIG. 8A, a demux 700 includes a symbol (i.e., bit, or data element) distribution module 703 and a switching module 702. The switching module 702 is shown with dashed lines, and the distribution module 703 encompasses all elements not within the switching module 702. Various signals pertaining to the demux 700 are illustrated in the timing diagram of FIG. 8B. The demux 700 is configured to provide maximum diversity gain in a communications system with three carrier frequency bands. The demux 700 is advantageously implemented in hardware with discrete gate logic, as shown. In alternate embodiments a demux may be implemented as a software module residing in a conventional storage medium (or, alternatively, as firmware instructions) and executable by a conventional microprocessor.

In the demux 700, the switching module 702 includes an AND gate configured to receive a CLOCK_INHIBIT_PULSE signal and a PULSE waveform. The CLOCK_INHIBIT_PULSE signal is applied after each quarter-frame has been processed, to accomplish the desired route switching. After the fourth quarter-frame has been processed (i.e., between successive frames), however, the CLOCK_INHIBIT_PULSE signal is not applied. The output of the switching module 702 is provided to a modulo-3 counter 706. Dual outputs of the modulo-3 counter 706 are provided to decoder logic 708. The decoder logic 708 may advantageously be implemented with combination logic and FFs. A first output from the decoder logic 708, a C0 waveform, is provided to an AND gate 710. A second output from the decoder logic 708, a C1 waveform, is provided to an AND gate 712. A third output from the decoder logic 708, a C2 waveform, is provided to an AND gate 714. The AND gates 710, 712, 714 also receive a data symbol stream input to the demux 700.

The output of the AND gate 710 is provided to an AND gate 716 and to an AND gate 718. A 2×SQUARE waveform is provided as a control input to the AND gate 716 and to an inverter 720. The output of the inverter 720 is provided to the AND gate 718. The output of the AND gate 712 is provided to an AND gate 722 and to an AND gate 724. The 2×SQUARE waveform is provided as a control input to the AND gate 722 and to an inverter 726. The output of the inverter 726 is provided to the AND gate 724. The output of the AND gate 714 is provided to an AND gate 728 and to an AND gate 730. The 2×SQUARE waveform is provided as a control input to the AND gate 728 and to an inverter 732. The output of the inverter 732 is provided to the AND gate 730.

The output of the AND gate 716 is provided to a buffer 734. The output of the AND gate 718 is provided to a buffer 736. The output of the AND gate 722 is provided to a buffer 738. The output of the AND gate 724 is provided to a buffer 740. The output of the AND gate 728 is provided to a buffer 742. The output of the AND gate 730 is provided to a buffer 744.

A 2×PULSE waveform is provided as a data input to AND gates 746, 748, 750. The AND gate 746 also receives the C0 waveform as an input. The AND gate 748 also receives the C1 waveform as an input. The AND gate 750 also receives the C2 waveform as an input. The output of the AND gate 746 is provided to AND gates 752, 754. The 2×SQUARE waveform is provided as a control input to the AND gate 754 and to an inverter 756. The output of the inverter 756 is provided to the AND gate 752. The output of the AND gate 748 is provided to AND gates 758, 760. The 2×SQUARE waveform is provided as a control input to the AND gate 760 and to an inverter 762. The output of the inverter 762 is provided to the AND gate 758. The output of the AND gate 750 is provided to AND gates 764, 766. The 2×SQUARE waveform is provided as a control input to the AND gate 766 and to an inverter 768. The output of the inverter 768 is provided to the AND gate 764.

Figure 8B:
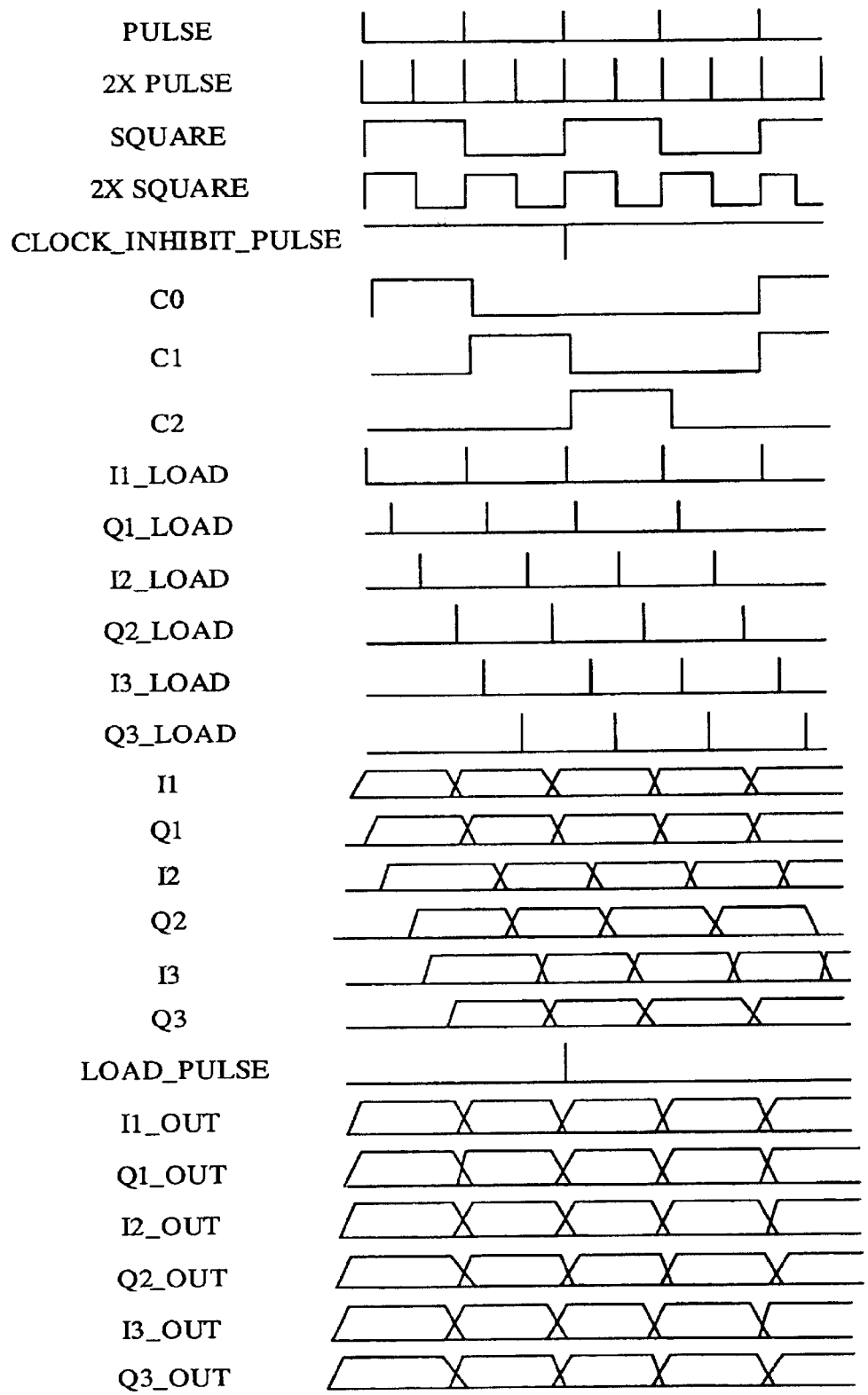
FIG. 8B is a timing diagram associated with the demultiplexer of FIG. 8A.

The output of the AND gate 752, an I1_LOAD waveform, as shown in FIG. 8B, is provided to the buffer 734. The output of the AND gate 754, a Q1_LOAD waveform, as shown in FIG. 8B, is provided to the buffer 736. The output of the AND gate 758, an I2_LOAD waveform, as shown in FIG. 8B, is provided to the buffer 738. The output of the AND gate 760, a Q2_LOAD waveform, as shown in FIG. 8B, is provided to the buffer 740. The output of the AND gate 764, an I3_LOAD waveform, as shown in FIG. 8B, is provided to the buffer 742. The output of the AND gate 766, a Q3_LOAD waveform, as shown in FIG. 8B, is provided to the buffer 744.

The output of the buffer 734, an I1 signal, as shown in FIG. 8B, is provided to a buffer 770. The output of the buffer 736, a Q1 signal, as shown in FIG. 8B, is provided to a buffer 772. The output of the buffer 738, an I2 signal, as shown in FIG. 8B, is provided to a buffer 774. The output of the buffer 740, a Q2 signal, as shown in FIG. 8B, is provided to a buffer 776. The output of the buffer 742, an I3 signal, as shown in FIG. 8B, is provided to a buffer 778. The output of the buffer 744, a Q3 signal, as shown in FIG. 8B, is provided to a buffer 780. The buffers 770, 772, 774, 776, 778, 780 each receive a LOAD_PULSE waveform as an input. As illustrated in FIG. 8B, the output symbol streams from the buffers 770, 772, 774, 776, 778, 780, respectively I1_OUT, Q1_OUT, I2_OUT, Q2_OUT, I3_OUT, and Q3_OUT are time synchronized due to the respective buffers 770, 772, 774, 776, 778, 780.

Figure 9:
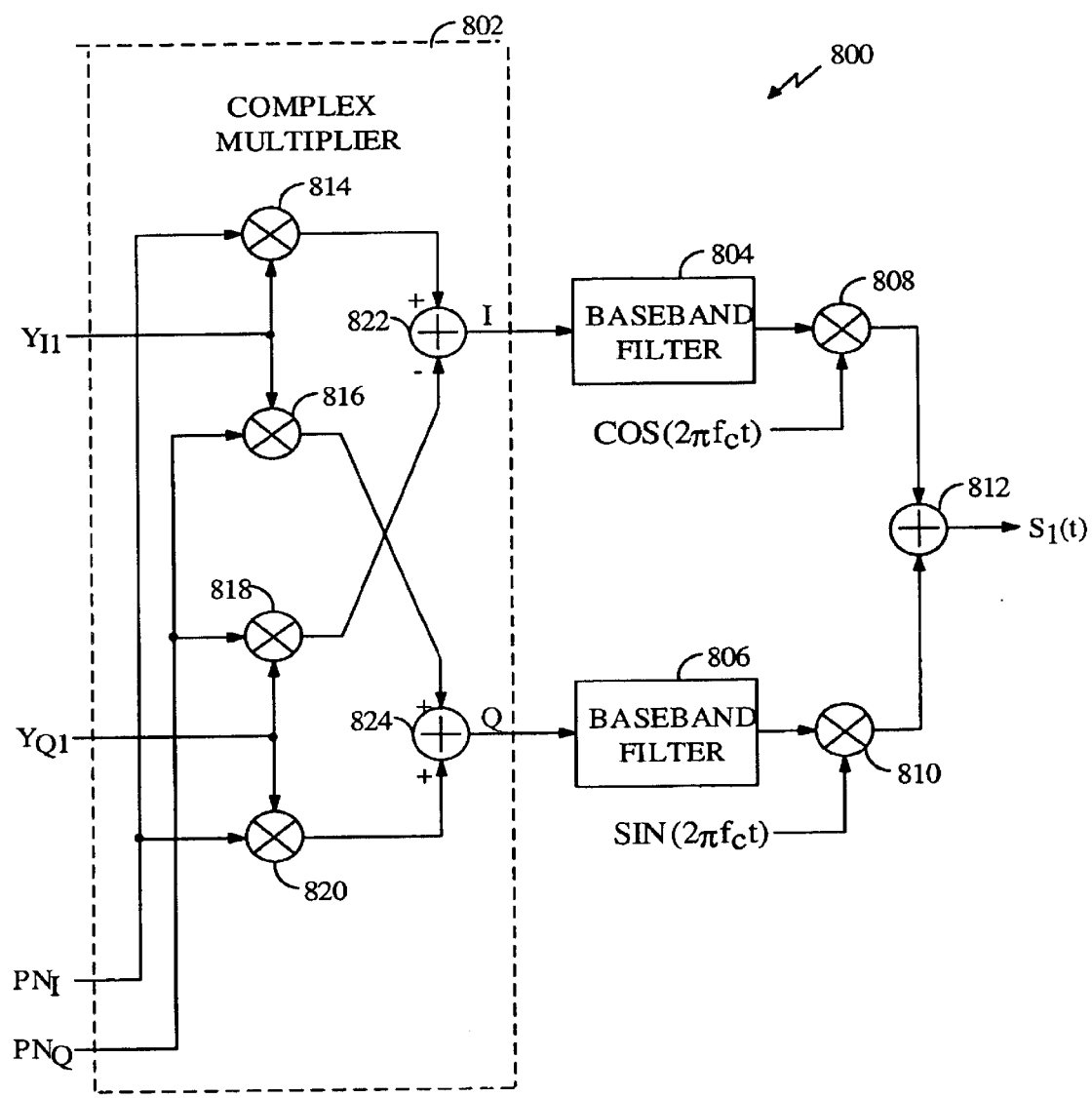
FIG. 9 is a block diagram of a pseudo-random noise spreader for generating complex I and Q signals.

In FIG. 9, in accordance with one embodiment, a complex I and Q spreader 800 that could be used in the transmit section 10 of FIG. 1 includes a complex multiplier 802 (shown functionally with dashed lines), first and second baseband filters 804, 806, first and second multipliers 808, 810, and an adder 812. The complex multiplier 802 includes four multipliers 814, 816, 818, 820 and two adders 822, 824. The complex multiplier 802, multipliers 808, 810, and adder 812 are advantageously conventional devices as known in the art.

It should be pointed out that the notation for inputs and outputs in the description below includes the subscript 1 to denote the fact that the complex I and Q spreader 800 is being used in connection with transmitter antenna number 1. The complex I and Q spreader 800 could equally well be used in connection with transmitter antenna number 2, or with any transmitter antenna in a communications system using more than two antennas, such as, e.g., a multicarrier system.

It should also be noted that the complex I and Q spreader 800 includes upconversion circuitry, as described below. Hence, the upconverter 24 in the transmit section 10 of FIG. 1 would not be necessary if the complex I and Q spreader 800 were substituted for the complex I and Q spreader 20 in the transmit section 10 of FIG. 1.

Data chips to be included in the I component of a complex I and Q signal output from the complex I and Q spreader 800, $s_1(t)$, are received by the complex I and Q spreader 800 at a $Y_{I1}$ input. The $Y_{I1}$ input is coupled to the multipliers 814 and 816. Data chips to be included in the Q component of the output signal $s_1(t)$ are received by the complex I and Q spreader 800 at a $Y_{Q1}$, input. The $Y_{Q1}$ input is coupled to the multipliers 818 and 820. A pseudo-random noise (PN) code for the I component is coupled to each of the four multipliers 814, 816, 818, 820 through a $PN_I$ input. A PN code for the Q component is coupled to each of the four multipliers 814, 816, 818, 820 through a $PN_Q$ input. An output product from the multiplier 814 is provided to the adder 822. An output product from the multiplier 816 is provided to the adder 824. An output product from the multiplier 818 is provided to the adder 822. An output product from the multiplier 820 is provided to the adder 824.

The adder 824 is configured to sum the two received inputs and provide a Q chip output stream to the second baseband filter 806. The adder 822 is configured to subtract the input received from the multiplier 814 from the input received from the multiplier 818, and provide an I chip output stream to the first baseband filter 804. The adders 822, 824 may advantageously be programmably configured to either add or subtract, as desired.

The first baseband filter 804, which is advantageously a conventional digital filter 804, filters the received I chip stream to provide an I chip stream at baseband frequency to the multiplier 808. The second baseband filter 806, which is likewise advantageously a conventional digital filter 806, filters the received Q chip stream to provide a Q chip stream at baseband frequency to the multiplier 810.

The multiplier 808 is configured to receive at a second input a $\cos(2\pi f_c t)$ signal, where $f_c$ is the carrier frequency, e.g., 800 MHz in a cellular system, or 1900 MHz in a PCS system, and t represents time. The multiplier 808 multiplies the two received signals, thereby upconverting the I chips to the carrier frequency, and provides a product output signal to the adder 812. The multiplier 810 is configured to receive at a second input a $\sin(2\pi f_c t)$ signal. The multiplier 810 multiplies the two received signals, thereby upconverting the Q chips to the carrier frequency, and provides a product output signal to the adder 812. The adder 812 sums the two received signals to generate the complex I and Q output signal $s_1(t)$, which is subsequently converted to analog RF format and transmitted.

The above-described embodiments illustrate a scheme for achieving improved antenna diversity in connection with a bit-reversal channel interleaver. Thus, in an exemplary embodiment, when a 384-bit interleaver organized as a matrix with six rows and sixty-four columns is coupled (either directly or indirectly) to a demultiplexer configured to optimize antenna diversity as described above, the antenna assignment is unaltered during the first half of transmission of each frame. However, when the second half of the data bits of the frame are transmitted, i.e., the $192^{nd}$ bit through the $383^{rd}$ bit (assuming a zero-th bit), the even bits are routed to antenna 2 and the odd bits are routed to antenna 1. Namely, the data paths are switched before the $192^{nd}$ bit is transmitted, such that antenna 1 is "skipped," or bypassed, and antenna 2 is selected instead when the $192^{th}$ bit is transmitted. Alternatively, antenna 2 is "repeated," thereby being selected instead when the $192^{nd}$ bit is transmitted.

Hence, any two adjacent bits in the bit-reversal channel interleaver will be transmitted from different antennas.

In another exemplary embodiment, a channel interleaver is coupled (either directly or indirectly) to a demultiplexer that is minimally modified from the demultiplexer of the above-described, two-antenna-diversity embodiment. The demultiplexer is configured to optimize 3×multicarrier transmission, or alternatively to optimize triple antenna diversity. Assuming that three frequency bands, or carriers, (in the alternative, three antennas) are denoted 1, 2, and 3, respectively, each block, or frame, of data is divided into three substantially equal blocks. For the first block of data, the bits are transmitted in the following order: 1, 2, 3, 1, 2, 3, etc. At the end of a block, one carrier (or alternatively, one antenna) is "skipped," or bypassed, and transmission is initiated from the next carrier (or antenna). For example, if at the end of a block of data, transmission is occurring over bands (or antennas) 1, 2, 3, 1, 2, 3, ending at the band 3, the first bit of the next block of data is transmitted over band (or antenna) 2, instead of over band (or antenna) 1. Transmission of the block of data then continues in order: 3, 1, 2, 3, 1, 2, 3, etc. Alternatively, one carrier (or one antenna) is repeated, and transmission is initiated from that carrier (or antenna). For example, if at the end of a block of data, transmission is occurring over bands (or antennas) 1,2,3,1, 2,3, ending at the band 3, the first bit of the next block of data is transmitted over band (or antenna) 3 again. Transmission of the block of data then continues in order: 1,2,3,1,2,3, etc.

Those skilled in the art would appreciate that the above-described embodiments allow a single channel interleaver design to be applied with optimal diversity gain to various different transmit systems. With a simple modification of the demultiplexer switching scheme, a bit-reversal channel interleaver can be used to achieve optimal diversity gain with any number of antennas or carriers.

It would further be understood by those of skill that an interleaver in accordance with one embodiment may be described generally as follows: If the interleaver input symbols are written sequentially at addresses $N_{IN}$ from 0 to block length N-1, then the symbols are read out of the interleaver from addresses $$N_{OUT}=(2^m)(N_{IN} \bmod N)+Bit\_Rev_m([N_{IN}/N]),$$

where $[N_{IN}/N]$ indicates the largest integer that is less than or equal to $N_{IN}/N$, and $Bit\_Rev_m([N_{IN}/N])$ indicates the bit-reversed, m-bit value of $[N_{IN}/N]$.

Thus, a demultiplexer for channel interleaving in communications systems with multiple carriers and/or transmitter diversity has been described. Those of skill in the art would understand that while the embodiments disclosed herein have been described in the context of an IS-95-based, digital wireless, cellular telephone system, the features of the instant invention lend themselves equally well to application in any form of communications system, including, e.g., a satellite communications system. It would further be understood by those skilled in the art that the embodiments described herein may be used to channel encode either data or voice communications. It would also be understood that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art.

Preferred embodiments of the present invention have thus been shown and described. It would be apparent to one of ordinary skill in the art, however, that numerous alterations may be made to the embodiments herein disclosed without departing from the spirit or scope of the invention.

Therefore, the present invention is not to be limited except in accordance with the following claims.

What is claimed is:

1. A demultiplexer for channel interleaving, comprising:
   a distribution module configured to receive a plurality of input data elements comprising first input data elements and subsequent input data elements, and configured to generate a plurality of outputs comprising a first output and other outputs, wherein the distribution module is configured to route the plurality of input data elements in succession to a plurality of outputs, wherein the first input data elements are routed to the first output; and
   a switching module coupled to the distribution module and configured to control the distribution module to once bypass routing of the subsequent input data elements to the first output after the first input data elements have been distributed to the first output, such that subsequent input data elements are routed to at least one of the other outputs that is different than the first output to which the first input data elements were routed.

2. The demultiplexer of claim 1, wherein the first input data elements comprise a predefined number of input data elements that is equal to half of the plurality of input data elements.

3. The demultiplexer of claim 1, wherein the first input data elements comprise a predefined number of input data elements that is equal to one-third of the plurality of input data elements.

4. The demultiplexer of claim 1, wherein the first input data elements comprise a predefined number of input data elements that is equal to one-fourth of the plurality of input data elements.

5. A method of demultiplexing data elements, comprising:
   receiving a plurality of input data elements comprising first input data elements and subsequent input data elements;
   routing the plurality of input data elements in succession to a plurality of outputs comprising a first output and other outputs, wherein the first input data elements are routed to the first output; and
   once bypassing routing of the subsequent input data elements to the first output after the first input data elements have been distributed to the first output,
   wherein subsequent input data elements are routed to at least one of the other outputs that is different than the first output to which the first input data elements were routed.

6. The method of claim 5, wherein the input data elements are segmented into frames prior to performing the routing step, each frame comprising the plurality of input data elements, and wherein the first input data elements comprise a predefined number of input data elements that is equal to half of the number of input data elements in the frame segment.

7. The method of claim 5, wherein the input data elements are segmented into frames prior to performing the routing step, each frame comprising the plurality of input data elements, and wherein the first input data elements comprise a predefined number of input data elements that is equal to one-third of the number of input data elements in the frame segment.

8. The method of claim 5, wherein the input data elements are segmented into frames prior to performing the routing step, each frame comprising the plurality of input data elements, and wherein the first input data elements comprise a predefined number of input data elements that is equal to one-fourth of the number of input data elements in the frame segment.

9. The method of claim 5, wherein the plurality of input data elements comprise input, bit-reversal-interleaved data elements.

10. A demultiplexer, comprising:
    means for receiving a plurality of input data elements comprising first input data elements and subsequent input data elements;
    means for routing the plurality of input data elements in succession to a plurality of outputs comprising a first output and other outputs, wherein the first input data elements are routed to the first output; and
    switching means for at least once bypassing routing of the subsequent input data elements to the first output after the first input data elements have been distributed to the first output,
    wherein subsequent input data elements are routed to at least one of the other outputs that is different than the first output to which the first input data elements were routed.

11. The demultiplexer of claim 10, wherein the input data elements are segmented into frames prior to being routed, each frame comprising the plurality of input data elements, and wherein the first input data elements comprise a predefined number of input data elements that is equal to half of the number of input data elements in the frame segment.

12. The demultiplexer of claim 10, wherein the input data elements are segmented into frames prior to being routed, each frame comprising the plurality of input data elements, and wherein the first input data elements comprise a predefined number of input data elements that is equal to one-third of the number of input data elements in the frame segment.

13. The demultiplexer of claim 10, wherein the input data elements are segmented into frames prior to being routed, each frame comprising the plurality of input data elements, and wherein the first input data elements comprise a predefined number of input data elements that is equal to one-fourth of the number of input data elements in the frame segment.

* * * * *